United States Patent
Saito et al.

(10) Patent No.: US 10,556,540 B2
(45) Date of Patent: Feb. 11, 2020

(54) VEHICLE SURROUNDINGS MONITORING APPARATUS

(71) Applicant: SUBARU CORPORATION, Tokyo (JP)

(72) Inventors: Hirotaka Saito, Tokyo (JP); Kazufumi Suzuki, Tokyo (JP); Junya Seki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 82 days.

(21) Appl. No.: 15/445,183

(22) Filed: Feb. 28, 2017

(65) Prior Publication Data

US 2017/0282797 A1    Oct. 5, 2017

(30) Foreign Application Priority Data

Mar. 31, 2016 (JP) .................. 2016-070836

(51) Int. Cl.
*B60R 1/00* (2006.01)
*H04N 7/18* (2006.01)

(52) U.S. Cl.
CPC .............. *B60R 1/00* (2013.01); *H04N 7/181* (2013.01); *B60R 2300/105* (2013.01);
(Continued)

(58) Field of Classification Search
None
See application file for complete search history.

(56) References Cited

U.S. PATENT DOCUMENTS

| 7,161,616 B1 | 1/2007 | Okamoto et al. |
| 2008/0239527 A1* | 10/2008 | Okabe ............ B60Q 9/008 |
| | | 359/843 |

(Continued)

FOREIGN PATENT DOCUMENTS

| CN | 1344470 A | 4/2002 |
| CN | 101277432 A | 10/2008 |

(Continued)

OTHER PUBLICATIONS

Office Action issued in corresponding Japanese Patent Application No. 2016-070836, dated Jul. 25, 2017.
(Continued)

*Primary Examiner* — Ricky Chin
(74) *Attorney, Agent, or Firm* — McDermott Will & Emery LLP (57) ABSTRACT

A vehicle surroundings monitoring apparatus is configured to be provided in an own vehicle and to perform image display related to information on a situation of surroundings of the own vehicle. The own vehicle includes a windshield. The vehicle surroundings monitoring apparatus includes an image generator and an image display. The image generator is configured to generate an image expressing an environment of the surroundings of the own vehicle. The image includes an own vehicle forward image having a view substantially equivalent to a view of a forward region of the own vehicle that is viewable by an occupant of the own vehicle through the windshield at a time of normal driving of the own vehicle. The image display is configured to be disposed on forward side of the occupant of the own vehicle and faces the occupant, and to display the image generated by the image generator.

2 Claims, 4 Drawing Sheets

(52) U.S. Cl.
CPC ... *B60R 2300/205* (2013.01); *B60R 2300/301* (2013.01); *B60R 2300/302* (2013.01); *B60R 2300/80* (2013.01)

(56) References Cited

U.S. PATENT DOCUMENTS

| | | | | |
|---|---|---|---|---|
| 2009/0079828 | A1* | 3/2009 | Lee | B60R 1/00 348/148 |
| 2010/0134264 | A1 | 6/2010 | Nagamine | B60Q 9/005 340/435 |
| 2012/0062743 | A1* | 3/2012 | Lynam | B60Q 9/005 348/148 |
| 2012/0257056 | A1* | 10/2012 | Otuka | G06T 1/0007 348/148 |
| 2013/0002809 | A1* | 1/2013 | Shimizu | G06T 3/0062 348/38 |
| 2013/0083197 | A1* | 4/2013 | Yamakage | G07C 5/0891 348/148 |
| 2013/0093851 | A1* | 4/2013 | Yamamoto | G01S 15/931 348/46 |
| 2013/0135478 | A1* | 5/2013 | Kim | G02B 23/12 348/149 |
| 2015/0010207 | A1* | 1/2015 | Inada | B60K 35/00 382/103 |
| 2015/0015479 | A1* | 1/2015 | Cho | G06F 3/013 345/156 |
| 2015/0052619 | A1* | 2/2015 | Kwak | G06F 21/6245 726/28 |
| 2016/0090041 | A1* | 3/2016 | Nagasawa | B60R 1/00 345/7 |
| 2016/0198126 | A1* | 7/2016 | Matsumoto | H04N 7/181 348/118 |
| 2016/0335510 | A1* | 11/2016 | Gupta | G06K 9/00805 |
| 2016/0342205 | A1* | 11/2016 | Shigeta | A61B 3/113 |
| 2017/0050542 | A1* | 2/2017 | Shigeta | G02B 27/0149 |
| 2017/0253181 | A1* | 9/2017 | Choi | B60Q 9/008 |
| 2017/0270899 | A1* | 9/2017 | Sato | G06T 11/60 |
| 2018/0056996 | A1* | 3/2018 | Lee | B60T 8/17557 |

FOREIGN PATENT DOCUMENTS

| | | |
|---|---|---|
| JP | 2007-087337 A | 4/2007 |
| JP | 2007-101421 A | 4/2007 |
| JP | 2008-157880 A | 7/2008 |
| JP | 2010-165087 A | 7/2010 |
| JP | 2011-230563 A | 11/2011 |
| JP | 2013-046124 A | 3/2013 |

OTHER PUBLICATIONS

Chinese Office Action issued in corresponding Chinese Patent Application No. 201710140928, dated Jul. 31, 2018, with English Translation.
Chinese Office Action issued in corresponding Chinese Patent Application No. 201710140928.3, dated Dec. 17, 2018.

* cited by examiner

VEHICLE SURROUNDINGS MONITORING APPARATUS

CROSS-REFERENCE TO RELATED APPLICATIONS

The present application claims priority from Japanese Patent Application No. 2016-070836 filed on Mar. 31, 2016, the entire contents of which are hereby incorporated by reference.

BACKGROUND

The technology relates to a vehicle surroundings monitoring apparatus that performs image display related to information on a situation of surroundings of a vehicle such as an automobile.

A vehicle such as an automobile which performs automatic driving may have an automatic driving system based on a premise that an occupant of the vehicle takes over a driving operation and performs manual driving in the event of an emergency or any other situation. The vehicle having the foregoing system may require the occupant to constantly monitor a situation of surroundings of the own vehicle and thereby determine, where appropriate, reasonableness of an automatic driving control and necessity of taking over the driving operation, i.e., whether it is possible to continue the automatic driving, for example. The occupant may be a driver at the time of manual driving, for example.

Various assist systems have been proposed that each provide an occupant of a vehicle such as an automobile with information on an environment of surroundings of the own vehicle, by means of image display or any other method.

For example, the technique disclosed in Japanese Unexamined Patent Application Publication (JP-A) No. 2010-165087 provides display units such as a side mirror, a rear-view mirror, a meter, and a navigation device of a vehicle. When a determination is made, on the basis of an image capturing a driver, that the driver is gazing at specific vehicle equipment having a display for a predetermined reference time period or longer, the display of the specific vehicle equipment displays a forward image of the vehicle.

JP-A No. 2011-230563 discloses a narrow road traveling assist apparatus that displays together, on a monitor, an image including a region ahead of an own vehicle and an image including a region on the left side of the own vehicle and a region on the right side of the own vehicle.

JP-A No. 2013-46124 discloses a driving assist apparatus that provides a rearward image of the own vehicle.

JP-A No. 2008-157880 discloses a driving assist apparatus that causes an image that has been captured during outward traveling to be displayed on part of a display during homeward traveling.

SUMMARY

As described above, when a vehicle performs automatic driving, it may be necessary for an occupant to monitor a situation ahead of the vehicle or a situation of surroundings of the vehicle, and thereby determine reasonableness of logic of the automatic driving. It may be also necessary for the occupant to make a transition to manual driving and take over a driving operation on an as-needed basis, or perform any other operation.

However, it may require continuous and considerable concentration for the occupant to visually and directly monitor, during automatic driving, the situation ahead of the vehicle or the situation of the surroundings of the vehicle through windows or with components such as mirrors. Further, this causes a considerable amount of movement of sight. This may increase a physical load of the occupant. One reason for this is that the monitoring is performed not in association with a driving operation performed by the occupant himself/herself. What is desired is to reduce the load of the occupant.

Various techniques, including those described above, of performing auxiliary display of information of surroundings of a vehicle during driving of the vehicle have been provided. However, a vehicle surroundings monitoring apparatus suitable for monitoring surroundings of a vehicle during automatic driving has not been proposed yet.

It is desirable to provide a vehicle surroundings monitoring apparatus that reduces a load of an occupant in monitoring surroundings of an own vehicle.

An aspect of the technology provides a vehicle surroundings monitoring apparatus configured to be provided in an own vehicle and to perform image display related to information on a situation of surroundings of the own vehicle. The own vehicle includes a windshield. The vehicle surroundings monitoring apparatus includes an image generator and an image display. The image generator is configured to generate an image expressing an environment of the surroundings of the own vehicle. The image includes an own vehicle forward image having a view substantially equivalent to a view of a forward region of the own vehicle that is viewable by an occupant of the own vehicle through the windshield at a time of normal driving of the own vehicle. The image display is configured to be disposed on forward side of the occupant of the own vehicle and faces the occupant, and to display the image generated by the image generator.

The own vehicle may further include a rear monitoring unit configured to monitor a rearward region of the own vehicle. The image may further include an own vehicle rearward image having a view substantially equivalent to a view of the rearward region of the own vehicle that is viewable by the occupant with the rear monitoring unit at the time of the normal driving.

An imaging unit may be further provided that is configured to capture an actual image of an exterior of the own vehicle. The image may further include the actual image captured by the imaging unit.

An environment recognizer may be further provided that is configured to recognize the environment of the surroundings of the own vehicle. The image may include a computer graphics that schematically expresses the environment of the surroundings of the own vehicle recognized by the environment recognizer.

The image display may display, in middle in a lateral direction of the image, a region included in the own vehicle forward image and corresponding to a forward region of the occupant.

The image display may display, in middle in a lateral direction of the image, a region included in the own vehicle forward image and corresponding to a forward region in middle of the own vehicle in a widthwise direction of the own vehicle.

DETAILED DESCRIPTION

One implementation of the technology displays, on a display, an image of surroundings of a vehicle, and thereby provides a vehicle surroundings monitoring apparatus that reduces a load of an occupant in monitoring the surroundings of the vehicle. The display faces an occupant who may be a driver of the vehicle. The image of the surroundings of the vehicle has a view substantially equivalent to a view that is viewable by the occupant through or with a component such as a windshield and a mirror at the time of normal driving.

[First Implementation]

A vehicle surroundings monitoring apparatus according to a first implementation as one example implementation of the technology is described below.

Figure 1:
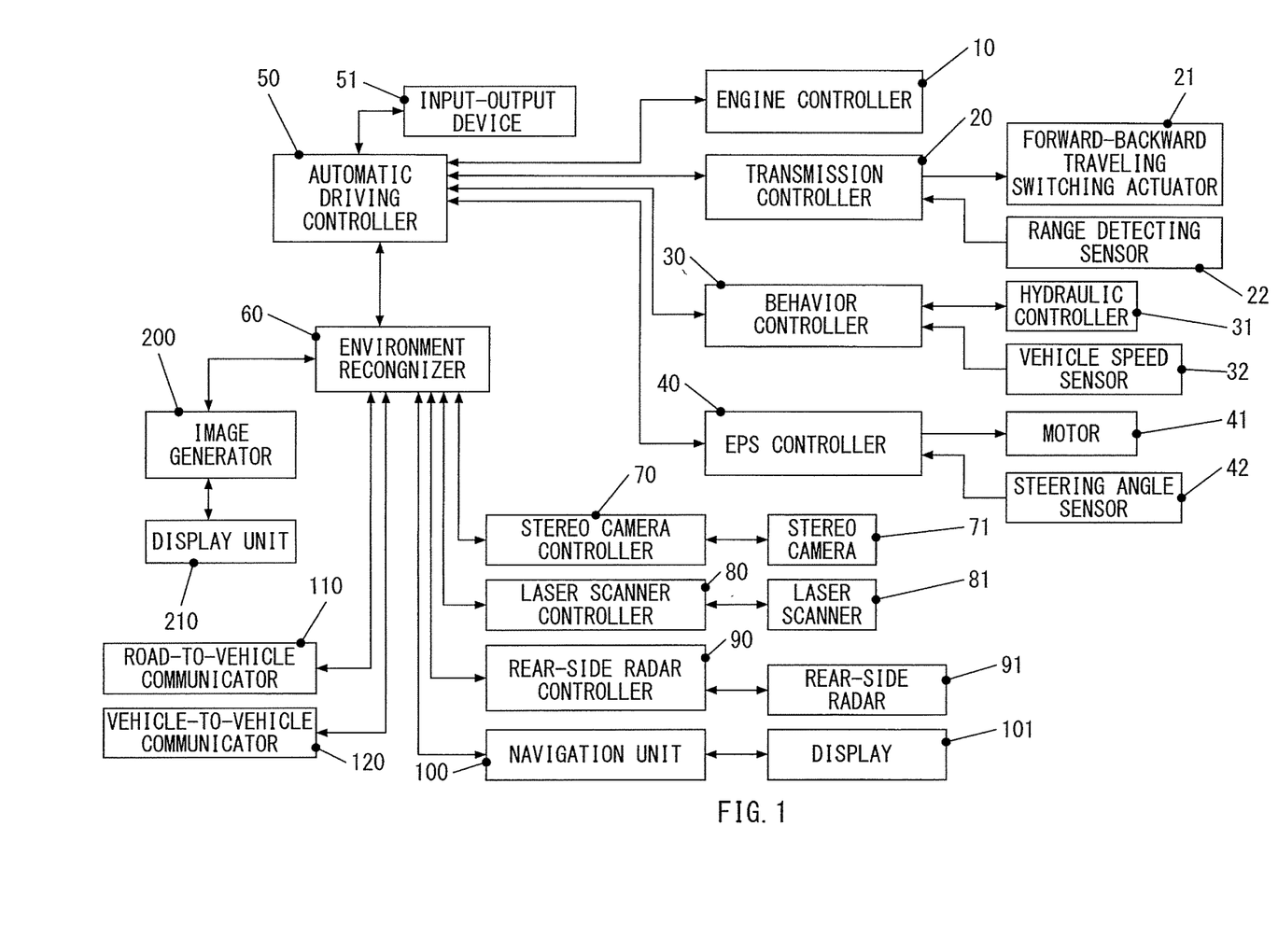
FIG. 1 is a block diagram schematically illustrating an example of a configuration of a vehicle to be provided with a vehicle surroundings monitoring apparatus according to a first implementation of the technology.

FIG. 1 is a block diagram schematically illustrating an example of a configuration of a vehicle to be provided with the vehicle surroundings monitoring apparatus according to the first implementation of the technology.

The vehicle surroundings monitoring apparatus according to the first implementation of the technology may be provided in a vehicle 1, for example. The vehicle 1 may be an automobile such as a passenger car that has an automatic driving function, for example. In one implementation, the vehicle 1 may serve as an "own vehicle". The vehicle surroundings monitoring apparatus performs image display for an occupant at the time of manual driving. The image display performed by the vehicle surroundings monitoring apparatus may be related to information on an environment of the surroundings of the own vehicle, for example.

The occupant is allowed to monitor a risk in the surroundings of the own vehicle and thereby examine reasonableness of an automatic driving control on the basis of the information provided by the vehicle surroundings monitoring apparatus at the time of automatic driving.

Referring to FIG. 1, the vehicle 1 may include an engine controller 10, a transmission controller 20, a behavior controller 30, an electric power steering (EPS) controller 40, an automatic driving controller 50, an environment recognizer 60, a stereo camera controller 70, a laser scanner controller 80, a rear-side radar controller 90, a navigation unit 100, a road-to-vehicle communicator 110, a vehicle-to-vehicle communicator 120, an image generator 200, a display unit 210, and any other component, for example.

Each of the foregoing units may include an information processor, storage, an input and output interface, a bus, and any other component, for example. Non-limiting examples of the information processor may include a central processing unit (CPU). Non-limiting examples of the storage may include a random access memory (RAM) and a read only memory (ROM). The bus may couple the foregoing components to each other, for example. The foregoing units may be communicatable with each other, for example, via a local area network (LAN) system provided for a vehicle. Non-limiting example of the LAN system provided for a vehicle may include a controller area network (CAN) communication system.

In one implementation, the image generator 200 may serve as an "image generator". In one implementation, the display unit 210 may serve as an "image display".

The engine controller 10 may control together an engine and any other auxiliary equipment. The engine may be a source of power allowing the vehicle 1 to travel.

The engine may be a four-stroke gasoline engine, for example.

The engine controller 10 may be able to control an output torque of the engine, for example, by controlling a throttle valve opening degree, a fuel injection amount, a fuel injection timing, and an ignition timing, of the engine. The engine controller 10 may be an engine control unit (ECU), for example.

When the vehicle 1 is driven on the basis of a driving operation performed by the occupant, the engine controller 10 may so control the output of the engine that an actual torque of the engine becomes closer to a torque required by the occupant. The torque required by the occupant may be set on the basis of a factor such as an operation amount of an accelerator pedal.

When the vehicle 1 performs the automatic driving, the engine controller 10 may control the output of the engine in accordance with instructions from the automatic driving controller 50.

The transmission controller 20 may transmit an output of revolutions of the engine, and control together an unillustrated transmission and any other auxiliary equipment. The transmission may switch between forward traveling and backward traveling of the vehicle 1. The transmission controller 20 may be a transmission control unit (TCU), for example.

When the vehicle 1 performs the automatic driving, the transmission controller 20 may perform operations such as range switching and setting of a transmission ratio in accordance with the instructions from the automatic driving controller 50. The range switching may switch between forward traveling and backward traveling, for example.

Non-limiting examples of the transmission may include various automatic transmissions such as a continuously-variable transmission (CVT) of a chain type, a belt type, or a toroidal type, a step-variable automatic transmission (AT), a dual clutch transmission (DCT), and an automated manual transmission (AMT). The step-variable AT, the DCT, and the AMT may each include a plurality of planetary gear sets.

The transmission may include, for example, a driving start device, a forward-backward traveling switching mechanism, and any other component in addition to a transmission mechanism. Non-limiting examples of the transmission mechanism may include a variator. Non-limiting examples of the driving start device may include a torque converter, a dry clutch, and a wet clutch. The forward-backward traveling switching mechanism may switch between a forward traveling range and a backward traveling range.

The transmission controller 20 may be coupled to devices such as a forward-backward traveling switching actuator 21 and a range detecting sensor 22.

The forward-backward traveling switching actuator 21 may drive a forward-backward traveling switching valve and thereby switch between the forward traveling and the backward traveling of the vehicle 1. The forward-backward traveling switching valve may switch an oil passage that performs hydraulic supply to the forward-backward traveling switching mechanism.

The forward-backward traveling switching actuator 21 may be an electric actuator such as a solenoid, for example.

The range detecting sensor 22 may be a sensor or a switch that determines whether a range currently selected by the transmission is the forward traveling range or the backward traveling range.

The behavior controller 30 may control wheel cylinder hydraulic pressures of hydraulic service brakes provided on respective front-right, front-left, rear-right, and rear-left wheels, independently of each other. The behavior controller 30 may thus perform a control including a behavior control and an anti-lock brake control. The behavior control may suppress a behavior of the vehicle 1 such as understeer and oversteer. The anti-lock brake control may prevent wheel lock at a time of braking.

The behavior controller 30 may be coupled to devices such as a hydraulic controller 31 and a vehicle speed sensor 32.

The hydraulic controller 31 may include an electric pump, a valve, and any other component, for example. The electric pump may pressurize brake fluid that is working fluid of the hydraulic service brake. The valve may adjust hydraulic supply to the wheel cylinders of the respective wheels independently of each other. The hydraulic controller 31 may be a hydraulic control unit (HCT), for example.

When the vehicle 1 performs the automatic driving, the hydraulic controller 31 may provide a braking force to the wheel cylinders of the respective wheels in response to brake instructions from the automatic driving controller 50.

The vehicle speed sensor 32 may be provided on a hub of each of the wheels. The vehicle speed sensor 32 may generate a vehicle speed pulse signal having a frequency that is proportional to revolution speed of the corresponding wheel.

The vehicle speed sensor 32 may be able to determine a traveling speed of the vehicle 1 (a vehicle speed) by detecting the frequency of the vehicle speed pulse signal and performing predetermined arithmetic processing on the basis of the detected frequency of the vehicle speed pulse signal.

The electric power steering (EPS) controller 40 may control together an electric power steering device and any other auxiliary equipment. The electric power steering device may assist, with an electric motor, a steering operation performed by the occupant.

The EPS controller 40 may be coupled to devices such as a motor 41 and a steering angle sensor 42.

The motor 41 may be an electric actuator that applies an assist force to a steering system of the vehicle 1 and thereby assists the steering operation performed by the occupant. Alternatively, the motor 41 may be an electric actuator that changes a steering angle at the time of the automatic driving.

When the vehicle 1 performs the automatic driving, the motor 41 may so apply a torque to the steering system that the steering angle of the steering system becomes closer to a predetermined target steering angle and thereby allow for steering, in response to steering instructions from the automatic driving controller 50.

The steering angle sensor 42 may detect a current steering angle of the steering system of the vehicle 1.

The steering angle sensor 42 may include a position encoder that detects an angular position of a steering shaft, for example.

The automatic driving controller 50 may supply, when an automatic driving mode is selected, control instructions to the foregoing units such as the engine controller 10, the transmission controller 20, the behavior controller 30, and the EPS controller 40. The automatic driving controller 50 may thus execute the automatic driving control that allows the vehicle 1 to travel automatically.

When the automatic driving mode is selected, the automatic driving controller 50 may set a target traveling trajectory along which the own vehicle 1 is to travel on the basis of, for example, information supplied from the environment recognizer 60 and instructions from an unillustrated occupant. The automatic driving controller 50 may also automatically perform operations such as acceleration (travel starting) of the vehicle 1, deceleration (stopping) of the vehicle 1, switching between forward traveling and backward traveling, and steering on the basis of, for example, information supplied from the environment recognizer 60 and instructions from an unillustrated occupant. The information supplied from the environment recognizer 60 may be related to a situation of the surroundings of the own vehicle. The automatic driving controller 50 may thus execute the automatic driving that allows the vehicle 1 to travel automatically to a preset destination.

In an example case where the occupant prefers manual driving or where it is difficult to continue performing the automatic driving, the automatic driving mode may be terminated in response to a predetermined deactivation operation performed by the occupant. This allows for returning to the manual driving mode in which the occupant performs the manual driving.

The automatic driving controller 50 may be coupled to an input-output device 51.

The input-output device 51 may supply information such as an alert and other various messages provided from the automatic driving controller 50 to the user. The input-output device 51 may also receive an input of various operations performed by the occupant.

The input-output device 51 may include devices such as an image display device, an audio output device, and an operation input device, for example. Non-limiting examples of the image display device may include a liquid crystal display (LCD). Non-limiting examples of the audio output device may include a speaker. Non-limiting examples of the operation input device may include a touch panel.

The environment recognizer 60 may recognize information on the surroundings of the own vehicle.

The environment recognizer 60 may recognize, for example, an obstacle and a shape of a lane of a road which the own vehicle is to travel, on a basis of information supplied from the respective units such as the stereo camera controller 70, the laser scanner controller 80, the rear-side radar controller 90, the navigation unit 100, the road-to-vehicle communicator 110, and the vehicle-to-vehicle communicator 120. Non-limiting examples of the obstacle may include a parked vehicle, a traveling vehicle, a building, terrains, and a pedestrian that are present in the surroundings of the own vehicle.

In one implementation, the environment recognizer 60 may serve as an "environment recognizer".

The stereo camera controller 70 may control a plurality of sets of stereo cameras 71 provided around the vehicle 1. The stereo camera controller 70 may also perform image processing on an image transmitted from the stereo cameras 71.

Each of the stereo cameras 71 may include, for example, a pair of camera units that are disposed side by side. The camera units each may include an imaging optical system, a solid-state imaging device, a drive circuit, and a signal processor, for example. Non-limiting examples of the imaging optical system may include a lens. Non-limiting examples of the solid-state imaging device may include a complementary metal oxide semiconductor (CMOS).

The stereo camera controller 70 may recognize a shape and a position relative to the own vehicle of an object captured by the stereo cameras 71 on the basis of a result of the image processing utilizing a stereo image processing technique.

In one implementation, the stereo cameras 71 may serve as an "imaging unit".

The laser scanner controller 80 may control a laser scanner 81. The laser scanner controller 80 may also recognize, as a three-dimensional (3D) point cloud data, various objects such as a vehicle and an obstacle in the surroundings of the vehicle 1, on the basis of an output from the laser scanner 81.

The rear-side radar controller 90 may control rear-side radar 91 that is provided on each of a left-side part and a right-side part of the vehicle 1. The rear-side radar controller 90 may also detect an object that is present in a rear-side region of the own vehicle on the basis of an output from the rear-side radar 91.

The rear-side radar 91 may be able to detect another vehicle approaching from the rear-side region of the own vehicle, for example.

Non-limiting examples of the rear-side radar 91 may include radar such as laser radar and millimeter wave radar.

Figure 2:
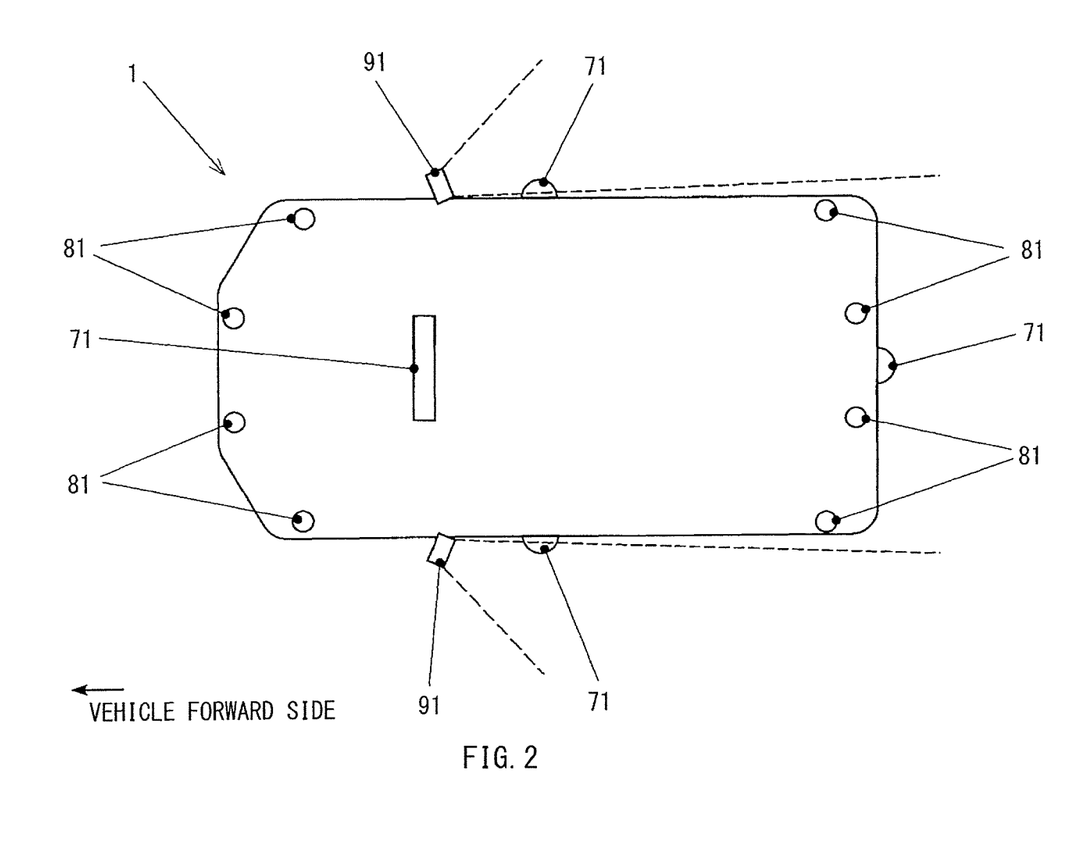
FIG. 2 schematically illustrates an example of an arrangement of sensors that recognize surroundings of the vehicle according to the first implementation of the technology.

FIG. 2 schematically illustrates an example of an arrangement of sensors provided in the vehicle 1 according to the first implementation. The sensors may recognize the surroundings of the vehicle 1.

The stereo cameras 71 may be provided on each of a front part, a rear part, a left-side part, and a right-side part of the vehicle 1.

The stereo camera 71 directed to capturing a forward region may be disposed in the vicinity of a top end of windshield inside the vehicle interior.

The laser scanner 81 may include a plurality of laser scanners 81. The laser scanners 81 may be so distributed that substantially no blind spot is present in the surroundings of the vehicle 1.

The rear-side radar 91 may be disposed on each of the left-side part and the right-side part of the vehicle 1, for example. The rear-side radar 91 may have a detection range that is directed rearward of the vehicle 1 and is directed outside in a widthwise direction of the vehicle 1.

The navigation unit 100 may include a device such as an own vehicle position determiner, a data storage, and a gyroscope. Non-limiting examples of the own vehicle position determiner may include a global positioning system (GPS) receiver. The data storage may store map data that is prepared in advance, for example. The gyroscope may detect an orientation of the own vehicle, for example.

The map data may include road information such as information on a road, an intersection, and an interchange. The road information may be so in detail as to include the information of lanes.

The road information may include three-dimensional data on a shape of a lane, and information on restrictions on traveling, for example. Non-limiting examples of the information on restrictions may include information on allowance or prohibition of right-hand turn and left-hand turn in each lane, a position requiring temporal stop of a vehicle, and a speed limit.

The navigation unit 100 may include a display 101 that is built in an instrument panel 340 which will be described later.

The display 101 may be an image display device that displays various pieces of information that are supplied by the navigation unit 100 to the occupant.

The display 101 may include a touch panel. Thus, the display 101 may also serve as an input unit that receives various operation inputs performed by the occupant.

The road-to-vehicle communicator 110 may communicate with an unillustrated ground station via a communication system compliant with predetermined standards. The road-to-vehicle communicator 110 may thereby acquire information on a traffic jam, a lighting state of a traffic light machine, a road work, an accident site, a lane control, weather, and a situation of a road surface, or any other information, for example.

The vehicle-to-vehicle communicator 120 may communicate with an unillustrated other vehicle via a communication system compliant with predetermined standards. The vehicle-to-vehicle communicator 120 may thereby acquire information on a state of a vehicle such as a position, an azimuth, an acceleration rate, and a speed of another vehicle, information on an attribute of a vehicle such as a type of a vehicle and a size of a vehicle, and any other information.

The image generator 200 may generate an image directed to monitoring, on the basis of information recognized by the environment recognizer 60. The image directed to monitoring may express a situation of the surroundings of the own vehicle.

The image generator 200 may generate an image that expresses a situation in a range that is viewable by the occupant from an occupant's point of view through a windshield 310, and an image that expresses a situation in a range that is viewable by the occupant from the occupant's point of view with a side mirror 330 and a rear-view mirror 380, for example. The image generator 200 may thereby display the generated images on the display 210.

The image generator 200 may include an image processor, a rendering engine, and any other device, for example. The image processor may process an image captured by the stereo cameras 71. The rendering engine may perform rendering on a computer graphics that expresses the situation of the surrounding of the own vehicle on the basis of a result of the recognition performed by the environment recognizer 60.

The image generated by the image generator 200 is described later in further detail.

Figure 3:
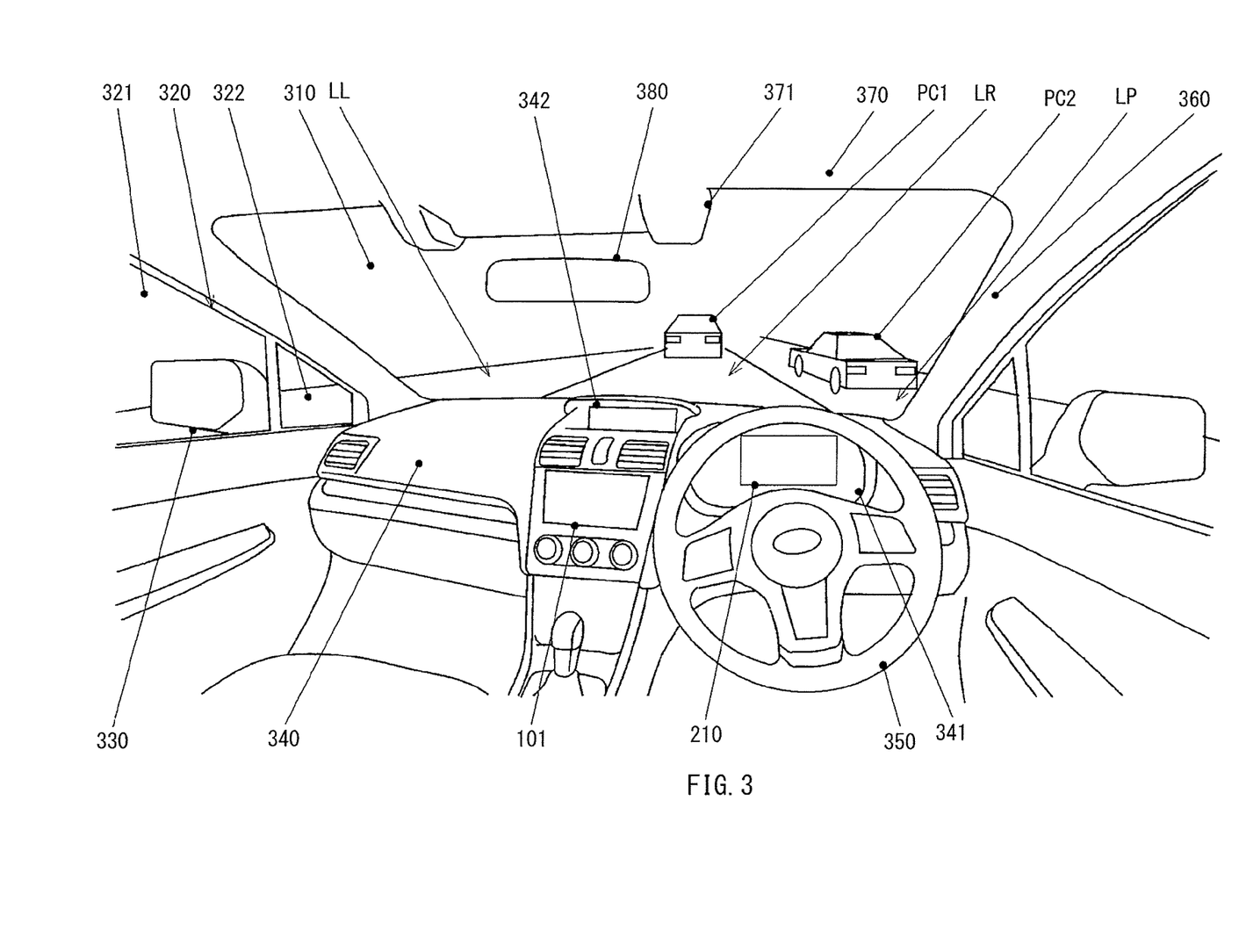
FIG. 3 illustrates an example of a view of an occupant in the vehicle provided with the vehicle surroundings monitoring apparatus according to the first implementation of the technology.

FIG. 3 illustrates an example of a view of an occupant of the vehicle 1 including the vehicle surroundings monitoring apparatus according to the first implementation of the technology. The occupant may be a driver at the time of the manual driving.

Referring to FIG. 3, the vehicle 1 may include the windshield 310, a front door glass 320, a side mirror 330, the instrument panel 340, a steering wheel 350, an A-pillar 360, a roof 370, the rear-view mirror 380, and any other component, for example.

The windshield 310 may be provided on forward side of the occupant.

The windshield 310 may have a substantially rectangular shape that is longer in a lateral direction. The windshield 310 may be quadric surface glass that is so curved as to protrude in a forward direction, for example.

The windshield 310 may so incline rearward that a top end of the windshield 310 is located on rearward side of the vehicle 1 with respect to a bottom end of the windshield 310, for example.

The front door glass 320 may be provided on the side of the occupant and on an upper part of each of right and left front doors. The right and left front doors may be used by an occupant to board or leave the vehicle 1.

The front door glass 320 may include a main part 321 and quarter glass 322, for example. The main part 321 may be movable upward and downward. The quarter glass 322 may be provided on the forward side of the main part 321 in a fixed manner.

The side mirror 330 may allow the occupant to confirm a view of a rear-left region or a view in a rear-right region.

The side mirror 330 may protrude outward in the widthwise direction of the vehicle 1 from an outer panel of each of a left front door and a right front door.

In an occupant's view, the side mirror 330 may be present in the vicinity of a front end of the main part 321 of the front door glass 320, for example.

In one implementation, the side mirror 330 may serve as a "rear monitoring unit".

The instrument panel 340 may be an interior member that is provided below the windshield 310 inside the vehicle interior.

The instrument panel 340 may also serve as an enclosure that contains components such as various meters, a display unit, switches, an air conditioner, an airbag of a navigator's seat, and a knee-protection airbag.

The instrument panel 340 may be provided with a combination meter 341, a multi-function display 342, the display 101 of the navigation unit 100, and any other component, for example.

The combination meter 341 may be provided in front of a driver's seat. The combination meter 341 may be an integration of various meters such as a speedometer, an engine revolution meter, and a milometer.

The combination meter 341 may include the display unit 210.

The multi-function display 342 may be provided in an upper part, of the middle in the widthwise direction of the vehicle 1, of the instrument panel 340, for example. The multi-function display 342 may be an image display device such as a liquid crystal display (LCD), for example.

The display 101 of the navigation unit 100 may be provided in a lower part, of the middle in the widthwise direction of the vehicle 1, of the instrument panel 340, for example.

The steering wheel 350 may be a circular operation member that receives the steering operation performed by the occupant at the time of the manual driving.

The steering wheel 350 may be provided on the forward side of the occupant and substantially face the occupant.

The combination meter 341 may be viewable by the occupant through an inner space on the upper half of the steering wheel 350 in the occupant's view.

The A-pillar 360 may be a vehicle body structure member that has a pillar shape. The A-pillar 360 may be provided along a side end of the windshield 310 and a front end of the front door glass 320.

A surface of the A-pillar 360 inside the vehicle interior may be covered with a pillar trim made of resin, for example.

The roof 370 may extend rearward from the top end of the windshield 310.

A surface of the roof 370 inside the vehicle interior may be covered with a roof trim made of resin, for example.

A stereo camera container 371 may be provided on a front end, of the middle in the widthwise direction of the vehicle 1, of the roof 370, for example. The stereo camera container 371 may contain the stereo cameras 71 directed to capturing an image of the forward region.

The rear-view mirror 380 may be provided inside the interior of the vehicle 1. The rear-view mirror 380 may allow for confirmation of the rearward region.

The rear-view mirror 380 may be provided in the vicinity of the upper end, of the middle in the widthwise direction of the vehicle 1, of the windshield 310 with an unillustrated stay in between.

In one implementation, the rear-view mirror 380 may serve as a "rear monitoring unit".

The display unit 210 may be an image display unit that faces the occupant of the vehicle 1.

Non-limiting examples of the display unit 210 may include the LCD built in the combination meter 341 in the instrument panel 340 as illustrated in FIG. 3, for example.

FIG. 3 illustrates an example state in which the own vehicle travels a left-hand traffic freeway having three lanes on one side. The freeway may be a high-standard vehicle-only road. The three lanes of the freeway may include a left travel lane LL, a right travel lane LR, and a passing lane LP in order from the left when viewing forward in the traveling direction.

The own vehicle may be traveling the right travel lane LR that is the middle lane of the three lanes.

A passenger car PC1 may be traveling ahead of the own vehicle, and another passenger car PC2 may be traveling the passing lane LP ahead of the own vehicle in a right-front direction.

When the vehicle 1 travels on the basis of the automatic driving, the occupant may be required to constantly monitor the foregoing state of the surroundings of the own vehicle. The occupant may be the driver at the time of the manual driving, for example.

However, it requires continuous and considerable concentration for the occupant to directly observe and monitor the state of the surroundings of the own vehicle through window glass such as the windshield 310, during the automatic driving which is not associated with the driving operation of the occupant. Further, an amount of movement of sight may be increased. The foregoing observation and monitoring may thus put a heavy load on the occupant.

To address this, the vehicle surroundings monitoring apparatus according to the first implementation may cause the image generator 200 to generate an image directed to monitoring described below, and the display unit 210 to display the generated image.

Figure 4:
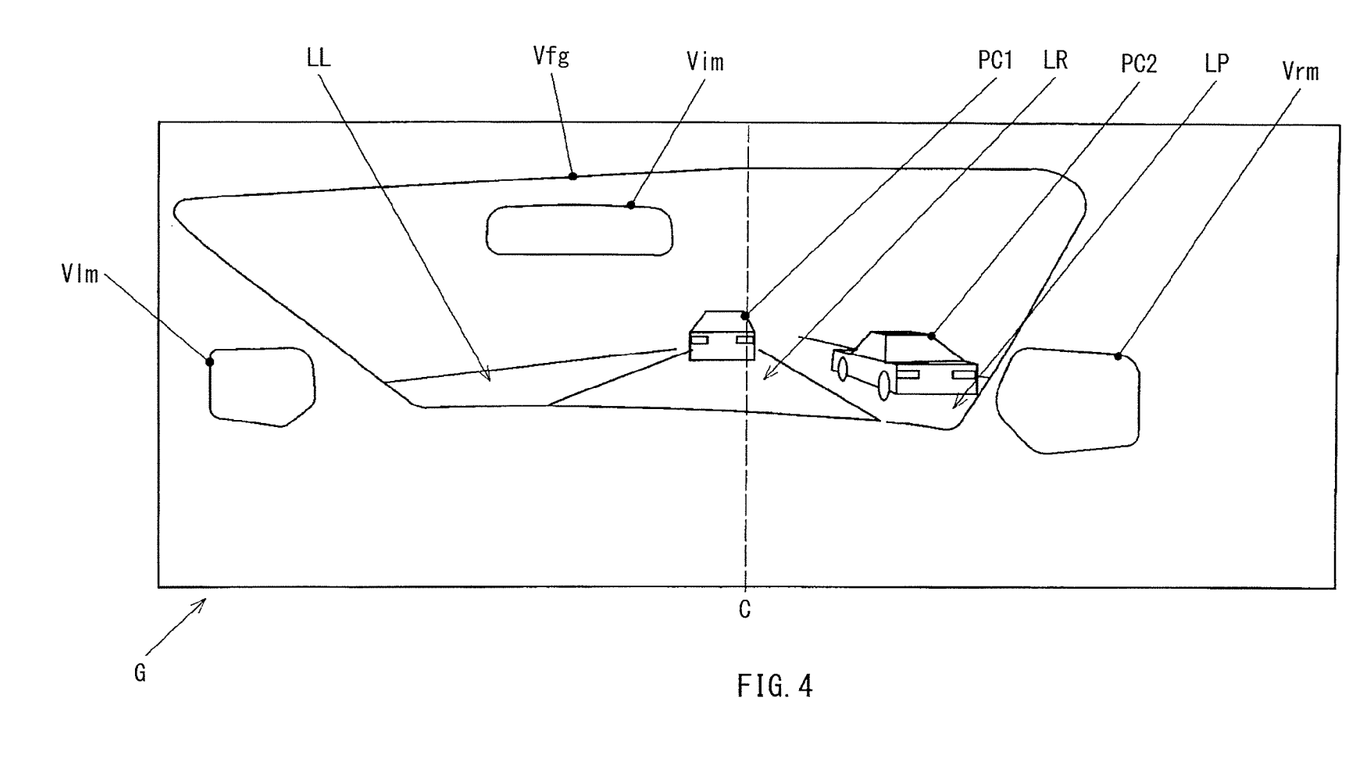
FIG. 4 illustrates an example of image display performed by the vehicle surroundings monitoring apparatus according to the first implementation of the technology.

FIG. 4 illustrates an example of image display performed by the vehicle surroundings monitoring apparatus according to the first implementation of the technology.

FIG. 4 illustrates the image display where a state in the forward region of the own vehicle corresponds to the state illustrated in FIG. 3.

Image display G displayed by the display unit 210 may include images that express respective ranges corresponding to a windshield view Vfg, a left side mirror view Vlm, and a right side mirror view Vrm. The windshield view Vfg, the left side mirror view Vlm, and the right side mirror view Vrm may be views from the occupant's point of view.

Further, the image of the windshield view Vfg may include an image expressing a range corresponding to a rear-view mirror view Vim from the occupant's point of view.

The windshield view Vfg may be a vehicle frontward image that corresponds to a forward view that is viewable by the occupant through the windshield 310.

The left side mirror view Vlm, the right side mirror view Vrm, and the rear-view mirror view Vim may each be a vehicle rearward image that corresponds to a rearward view that is viewable by the occupant with the left and right side mirrors 330 and the rear-view mirror 380.

Each of the foregoing images may be an image derived from an actual image that is subjected to a predetermined image processing. The actual image may include the actual situation of the surroundings of the own vehicle 1 that is captured by the imaging unit such as the stereo cameras 71. The predetermined image processing may include adjustment of brightness, color tone, contrast, and any other factor, and denoising. The image after the adjustment and the predetermined image processing may be used.

Alternately, a computer graphics may be used instead of the foregoing actual image. The computer graphics may schematically simplify details of the situation of the surroundings of the own vehicle, and have been subjected to rendering.

Alternately, an image of a combination of the actual image and the computer graphics may be used as an image included in the image display G.

In the image display G, a position, in the windshield view Vfg, corresponding to the front from the occupant's point of view may be located in the middle C in the left-right direction.

The first implementation described above may achieve at least the following effects.

(1) The display unit 210 displays an image having a range corresponding to the occupant's view through the windshield 310. This allows for the occupant to monitor, using only the display unit 210, a range corresponding to a view that is normally viewable by the occupant upon the manual driving performed by the occupant. The foregoing image having the range corresponding to the occupant's view through the windshield 310 may include the windshield view Vfg, for example.

This allows for the occupant to monitor the situation of the surroundings of the vehicle 1 with a relatively small amount of movement of sight. As a result, it is possible to reduce a load of the occupant in monitoring during the automatic driving.

(2) The display unit 210 displays images having respective ranges corresponding to rearward views viewable by the occupant with the right and left side mirrors and the rear-view mirror. This allows for the occupant to monitor, using only the display unit 210, in the rearward region of the own vehicle as well. The foregoing images having the respective ranges corresponding to the rearward views viewable with the right and left side mirrors and the rear-view mirror may include the left side mirror view Vlm, the right side mirror view Vrm, and the rear-view mirror view Vim, for example. As a result, it is possible to improve safety and usability.

(3) The display unit 210 displays the actual image of the surroundings of the own vehicle 1. This allows the occupant to observe the details of the situation of the surroundings of the vehicle 1.

For example, this may allow the occupant to observe in detail, with the display unit 210, of a direction of a sight of a person, a generation and a sex of a person, a type and characteristics of another vehicle, a state of a road surface, and content displayed on a sign, for example. Non-limiting examples of the person may include a driver of another vehicle, a pedestrian, and a cyclist. The occupant may make use of a result of the detailed observation in making a determination.

(4) The display unit 210 displays the computer graphics that schematically simplifies the environment of the surroundings of the own vehicle 1. This allows for the occupant to understand simply and intuitively an overall situation of the environment of the surroundings of the own vehicle 1.

(5) Locating, in the middle C in the lateral direction in the image display G, the position in the windshield view Vfg corresponding to the front from the occupant's point of view allows for easier association of the image displayed on the display unit 210 with the environment that is directly viewable by the user through the windshield 310 or any other component.

For example, when the occupant attempts to directly observe, through the windshield 310, a risk to which attention is called for by the display unit 210, the occupant's sight may be naturally guided in the direction of the risk.

<Second Implementation>

A vehicle surroundings monitoring apparatus according to a second implementation as one example implementation of the technology is described below.

It is to be noted that components of the second implementation substantially similar to those in the first implementation are denoted with the same numerals, and are not further described. The following description is given mainly on differences between the first and second implementations.

The vehicle surroundings monitoring apparatus according to the second implementation may so perform the image display that a position corresponding to a forward region of the middle of the own vehicle 1 in the widthwise direction in the windshield view Vfg is located at the middle in the lateral direction of the image. The forward region of the middle of the own vehicle 1 in the widthwise direction may be a point immediately in front of the middle of the own vehicle 1 in the widthwise direction, for example. The windshield view Vfg is included in the image display displayed on the display unit 210.

The second implementation described above achieves an effect of allowing for precise understanding of a lateral position of the own vehicle with respect to an object such as a road and another vehicle, in addition to effects substantially similar to the foregoing effects of the first implementation.

(Modifications)

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) The configuration of the vehicle surroundings monitoring apparatus, the configuration of the vehicle, and any other configuration are not limited to those described above referring to the implementations and are modifiable as appropriate. The foregoing implementations are described referring to an example case where the vehicle is a passenger car. However, the technology is applicable to any other vehicle. For example, the technology is applicable to a commercial vehicle such as a cargo vehicle, a truck, a bus, an automatic two-wheeled vehicle, and other various special-purpose vehicles.

(2) The foregoing implementations are described referring to an example case where the vehicle uses an engine as a source of power allowing the vehicle to travel. However, the technology is not limited thereto. Alternatively, an electric motor, a hybrid system combining an engine and an electric motor, or any other source may be used as the source of power allowing the vehicle to travel.

(3) The type, the arrangement, and any other factor of each of the sensors that recognize the environment of the surroundings of the own vehicle are not limited to those described in the foregoing implementations, and are modifiable as appropriate. For example, various sensors such as a millimeter wave sensor, a LiDAR, a monocular camera, and ultrasonic sonar may be used together with or instead of the sensors referred to in the foregoing implementations.

Moreover, for example, recognition of the environment may be performed on the basis of information acquired by a method such as road-to-vehicle communication and vehicle-to-vehicle communication, and the map data included in a device such as the navigation device and a measuring device of a system such as a GPS in addition to or instead of the information acquired by components such as the sensors mounted on the vehicle.

(4) The foregoing implementations are described referring to an example case where the image display is displayed by the display unit built in the instrumental panel. However, the technology is not limited thereto. Alternatively, the image display may be performed by any other method.

For example, the image display may be performed using a head-up display (HUD) apparatus that projects an image onto part of the windshield.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle surroundings monitoring apparatus comprising:
   at least one processor; and
   a memory storing instructions, which when executed by the at least one processor, cause the at least one processor to perform operations comprising:
      receiving, from one or more sensors on an own vehicle, an image of an environment surrounding the own vehicle;
      generating, based on the image of the environment surrounding the own vehicle, a first image of a view of a forward region of the own vehicle that is viewed from a perspective point of an occupant who drives the own vehicle through a windshield of the own vehicle at a time of manual driving, the forward region of the own vehicle being a part of the environment surrounding the own vehicle, the first image being in a shape of the windshield of the own vehicle as viewed from the perspective point of the occupant of the own vehicle;
      generating, based on the image of the environment surrounding the own vehicle, a second image of a view of a first rearward region of the own vehicle that is viewed from a perspective of the occupant via a first rear monitoring drive at the time of manual driving;
      displaying, on an image display facing the occupant of the own vehicle, the first image so that a point of the first image is set at a mid-point of the image display in a lateral direction of the image display, the point of the first image corresponding to a point of the forward region directly in front of the occupant; and
      displaying, on the image display facing the occupant of the own vehicle, the second image so that the second image is displayed apart from the first image at a predetermined distance,
      generating, based on the image of the environment surrounding the own vehicle, a third image of a view of a second rearward region of the own vehicle that is viewed from a perspective point of the occupant via a second rear monitoring device at the time of manual driving; and
      displaying, on the image display facing the occupant of the own vehicle, the third image so that the third image is displayed in an upper region of the first image,
      wherein the second image is displayed adjacent to a lower region of the first image disposed opposite to the upper region in a vertical direction.

2. The vehicle surroundings monitoring apparatus according to claim 1, wherein the operations further comprise
   detecting, by the one or more sensors, an object in the environment surrounding the own vehicle, wherein
   the first image comprises a computer graphics depicting the object in the environment surrounding the own vehicle.

* * * * *